United States Patent [19]

Leonardi

[11] Patent Number: 5,358,321
[45] Date of Patent: Oct. 25, 1994

[54] MODULAR MULTI-MEDIA CABINET

[75] Inventor: Paolo Leonardi, Sirolo Ancona, Italy

[73] Assignee: Fellowes Manufacturing Company, Itasca, Ill.

[21] Appl. No.: 256

[22] Filed: Jan. 4, 1993

[51] Int. Cl.⁵ .................. A47B 81/06; A47B 88/00
[52] U.S. Cl. ................... 312/9.55; 312/330.1
[58] Field of Search .................. 312/107–108, 312/117, 122, 9.3, 9.9, 9.47, 9.55, 330, 330.1; 206/97; 211/184; 220/4 E

[56] References Cited

U.S. PATENT DOCUMENTS

| | | |
|---|---|---|
| D. 277,816 | 3/1985 | Kleinert et al. . |
| D. 287,554 | 1/1987 | Radtke . |
| D. 291,633 | 9/1987 | Merzon . |
| D. 321,999 | 12/1991 | Hasuike . |
| D. 394,377 | 12/1888 | Kiefer . |
| 2,667,392 | 1/1954 | Sexton . |
| 3,203,744 | 8/1965 | Batke et al. . |
| 3,751,127 | 8/1973 | Black, Jr. et al. . |
| 3,909,078 | 9/1975 | Riley . |
| 4,317,607 | 3/1982 | Gomolka ................ 312/236 |
| 4,436,355 | 3/1984 | Fortune ................ 312/270 |
| 4,453,785 | 6/1984 | Smith . |
| 4,501,456 | 2/1985 | Schäfer . |
| 4,512,480 | 4/1985 | Evenson . |
| 4,540,222 | 9/1985 | Burrell ................ 211/175 X |
| 4,544,213 | 10/1985 | Long et al. . |
| 4,624,509 | 11/1986 | Ramsey . |
| 4,634,193 | 1/1987 | Liu . |
| 4,728,158 | 3/1988 | D'Elia et al. ................ 312/108 |
| 4,745,775 | 5/1988 | Bussan et al. . |
| 4,856,855 | 8/1989 | Hasuike . |
| 5,016,946 | 5/1991 | Reznikov et al. ................ 312/108 |
| 5,251,974 | 10/1993 | Beals ................ 312/330.1 |

OTHER PUBLICATIONS

P. 44 from a Global ® catalog published in 1987.
Pp. 37 and 38 from a Misco ® catalog available in the Summer of 1992.
A portion of the Global ® catalog dated Oct. 1992, including the cover and pp. 17-20.

*Primary Examiner*—Peter R. Brown
*Assistant Examiner*—Nancy Mulcare
*Attorney, Agent, or Firm*—Willian Brinks Hofer Gilson & Lione

[57] ABSTRACT

A modular multi-media cabinet is provided that can store and organize different combinations of media material. The cabinet can be combined vertically and horizontally with other like cabinets. The cabinet has an extractable drawer with removable partition members that can divide the drawer, or a portion of it, longitudinally. Columns of slots are located on the bottom to removably engage removable dividers to further organize media material stored within the drawer.

41 Claims, 4 Drawing Sheets

MODULAR MULTI-MEDIA CABINET

BACKGROUND OF THE INVENTION

The present invention relates to a modular multi-media cabinet that can be combined with other cabinets both horizontally and vertically and that can organize and store a variety of office materials, especially media material. In particular, the present invention is a drawer that can organize and store a variety of office products and is adapted to be slidably inserted into the modular cabinet.

Typically, cabinets are provided with one or more drawers for storing material including media material. Oftentimes it is desired to provide cabinets smaller than a file drawer cabinet so that media such as computer diskettes, audio cassettes and VHS cassettes can be stored and organized. An additional benefit of the smaller cabinets is that they can be easily transported by the user.

If the user, however, has a large amount of media material to store and organize, a number of cabinets will be required. Thus, it would be desirable if the cabinets could be stacked or combined so that the cabinets themselves could be organized while allowing the user to continue adding more cabinets as necessary.

U.S. Pat. No. 4,856,855, for example, describes modular cabinets that can be combined. One problem with this cabinet and others is that it can only hold media material and office products of like size. Consequently, cabinets and, thus drawers, having many different sizes must be manufactured to accommodate the varying sizes of media material. In particular, FIG. 1b of U.S. Pat. 4,856,855 shows three cabinets each having a different size and number of drawers. No single cabinet is able to store and organize a variety of different sized media products. Accordingly, there is a need for a modular multi-media cabinet that can store and organize a single type or a combination of different types of media in a single drawer. The modular multi-media cabinet of the present invention solves these needs.

SUMMARY OF THE INVENTION

The present invention comprises an extractable drawer for a modular multi-media cabinet comprising a bottom and four upwardly extending walls including a front wall, a rear wall spaced from and substantially parallel to the front wall, a first side wall at a substantially fight angle to the front wall, and a second side wall spaced from and substantially parallel to the first side wall.

The bottom is provided with a plurality of columns of slots that include a first column of spaced apart slots adjacent to the first side wall; a first column of complementary spaced apart slots adjacent to and on a first side of the approximate center longitudinal line of the bottom, with a portion of the complementary slots lying in the same plane as the slots in the first column; a second column of spaced apart slots adjacent to the second side wall; a second column of complementary spaced apart slots adjacent to and on a second side of the approximate center longitudinal line of the bottom, with a portion of the complementary slots lying in the same plane as the slots in the second column; a column of complementary spaced apart intermediate slots located between the second column of slots and the second column of complementary slots, with a portion of the complementary intermediate slots lying in the same plane as slots in the first column.

A plurality of dividers are preferably provided with the drawer to further organize media placed within the drawer. The dividers can include at least one small divider adapted to removably engage a slot in the first column and a corresponding slot in the first column of complementary slots thereby removably securing the divider. Preferably, the divider is such that it is adapted to removably engage a slot in the second column and a corresponding slot in the second complementary column to thereby removably secure the divider. In addition, at least one large divider can be provided wherein the large divider is adapted to removably engage a slot in the first column and a corresponding slot in the first column of complementary intermediate slots thereby removably securing the divider.

In another embodiment, a second column of complementary spaced apart intermediate slots is provided between the first column of slots and the first column of complementary slots, with a portion of the second complementary intermediate slots lying in the same plane as the slots in the second column. In this embodiment, the large divider is adapted to removably engage a slot in the second column and a corresponding slot in the second intermediate complementary column thereby removably securing the divider.

At least one removable partition member may be provided to further segregate the drawer. For example, at least one removable center partition may be provided along the approximate center longitudinal line of the drawer bottom. It may also be desirable to provide at least one removable intermediate partition member between the second column of slots and the first column of complementary spaced apart intermediate slots. In addition, a removable intermediate partition member may be provided between the first column of slots and the second column of complementary spaced apart intermediate slots. In the most preferred embodiment, the removable center partition member and the intermediate partition members have identical dimensions and shape.

In a preferred embodiment of the invention, the bottom of the drawer has a first column of spaced apart slots adjacent to the first side wall and a first column of complementary spaced apart slots adjacent to and on a first side of the approximate center longitudinal line of the bottom, with a portion of the complementary slots lying in the same plane as the slots in the first column. The bottom is also provided with a second column of spaced apart slots adjacent to the second side wall and a second column of complementary spaced apart slots adjacent to and on a second side of the approximate center longitudinal line of the bottom, with a portion of the complementary slots lying in the same plane as the slots in the second column. A column of spaced apart intermediate slots is provided on the bottom adjacent to the first side wall, the intermediate slots being in an alternating relationship with the slots in the first column of slots. A column of complementary spaced apart intermediate slots is provided on the bottom between the second column of slots and the second column of complementary slots, with a portion of the complementary intermediate slots lying in the same plane as the slots in the column of spaced apart intermediate slots.

In the most preferred embodiment, a modular multi-media cabinet is provided and comprises a cabinet case adapted to be attached to other cabinet cases with each case having a drawer adapted to be slidably received by the cabinet case. The drawer has a bottom provided with a plurality of slots. The drawer also has four walls extending substantially vertically upward that include a front wall, a rear wall spaced from and substantially parallel to the front wall, a first side wall at a substantially fight angle to the front wall, and a second side wall spaced from and substantially parallel to the first side wall.

The plurality of slots include a first column of spaced apart slots adjacent to the first side wall and a first column of complementary spaced apart slots adjacent to and on a first side of the approximate center longitudinal line of the bottom, with a portion of the complementary slots lying in the same plane as the slots in the first column. A second column of spaced apart slots is provided adjacent to the second side wall with a second column of complementary spaced apart slots adjacent to and on a second side of the approximate center longitudinal line of the bottom, with a portion of the slots in the second column of complementary slots lying in the same plane as the slots in the second column. A column of spaced apart intermediate slots is provided adjacent to the first side wall, the intermediate slots being in an alternating relationship with the first column of slots, and a column of complementary spaced apart intermediate slots located between the second column of slots and the second column of complementary slots, with a portion of the complementary intermediate slots lying in the same plane as slots in the column of spaced apart intermediate slots. Preferably, the case has at least one connecting hole at each of its lateral edges adapted to receive removable connecting clips and to thereby connect one or more cabinet cases.

Of course it is to be understood that the multi-media modular cabinet of the invention can be used to store and organize any number and type of media and their respective cases, or containers. For ease of description, but without intending to be limited, the storage of 3½ inch and 5¼ inch computer diskettes will be described.

DETAILED DESCRIPTION OF THE INVENTION AND PREFERRED EMBODIMENTS

Figure 1:
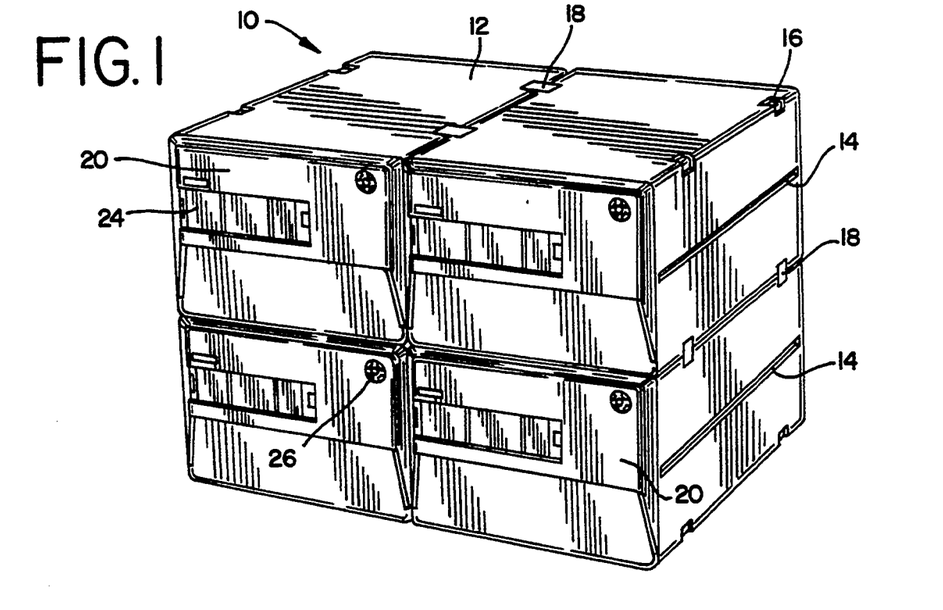
FIG. 1 is a front perspective view of four multi-media modular cabinets of the present invention connected vertically and horizontally.

FIG. 1 illustrates one embodiment of the invention wherein a plurality of multi-media modular cabinets 10 are connected vertically and horizontally. Cabinet 10 generally comprises a rectangular cabinet case 12 having an extractable drawer 30. Preferably, the cabinet case 12 is provided with at least one connecting hole 16 at each of its lateral edges. More preferably, two connecting holes 16 are provided. The connecting holes 16 are adapted to receive a removable connecting clip 18 to thereby secure a single cabinet case 12 to a like cabinet case in either a horizontal or vertical direction, as best seen in FIG. 1. Preferably, the cabinet case 12 is integrally molded of a suitable plastic material.

Figure 2:
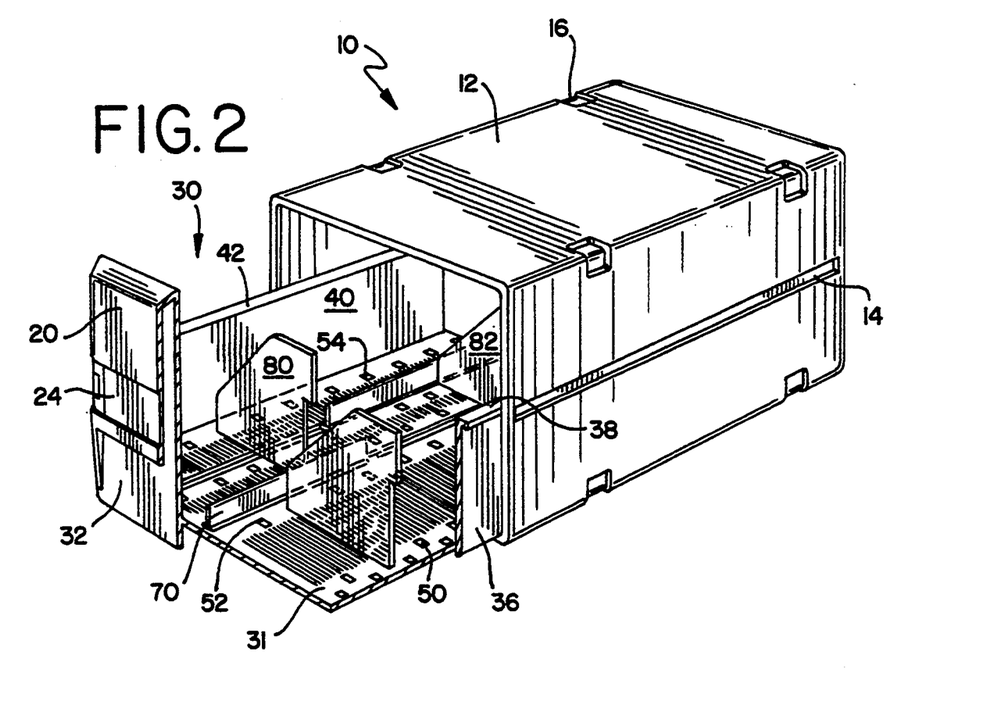
FIG. 2 is a front perspective view of a single cabinet case of the present invention with a drawer according to a preferred embodiment partially extracted, the front wall and a side wall of the drawer being partially cut away. Two small dividers, a center partition, a large divider, and an intermediate partition are located within the drawer.

The extractable drawer 30 generally comprises a bottom 31, and four upwardly extending walls including a front wall 32, a rear wall 34 spaced from and substantially parallel to the front wall 32, a first side wall 36 at a substantially right angle to the rear wall 34, and a second side wall 40 spaced from and substantially parallel to the first side wall 36.

A handle 20 may be provided on the outer portion of the front wall 32. The handle 20 may have any suitable shape dictated by, among other things, aesthetic and manufacturing considerations. Preferably, the handle 20 is integrally molded with the outer portion of the front wall and extends outwardly and downwardly to provide a space for the user's fingers so that the extractable drawer 30 may be slidably removed from the cabinet case 12. In this case, the handle 20 may be provided with a label frame having a label lens 24 as shown in FIG. 1. The label frame may be adapted to receive a placard or the like having writing on it to identify the contents of the cabinet. Preferably, the label lens 24 will be transparent so that any writing on such a placard can be viewed by the user.

The handle 20 may also be provided with a means for locking means 26 which can be adapted to interlock with a portion of the cabinet case to insure that the extractable drawer 30 cannot be slidably removed unless unlocked. Alternatively, a means for locking 26 can be provided on the outer portion of the front wall 32 to secure the drawer 30 from outward movement from the cabinet case 12. The locking means can include, but is not limited to, a knob, key lock, bolt, hasp, latch, clasp, catch, hook, and the like.

In another embodiment of the present invention, an extractable drawer 30 is provided for a modular multimedia cabinet 10. The drawer 30 comprises a bottom 31 with four walls extending substantially vertically upward. The walls include a front wall 32, a rear wall 34 spaced from and substantially parallel to the front wall 32; a first side wall 36 at a substantially right angle to the front wall 32 and a second side wall 40 spaced from and substantially parallel to the first side wall 36. Of course, the walls may have any suitable length as dictated by, among other things, manufacturing and consumer preferences. Preferably, the length of the front wall 32 and the rear wall 34, and thus the width of the bottom 31, is such that it can accommodate two columns of 3½ inch computer diskettes, placed side by side.

Figure 3:
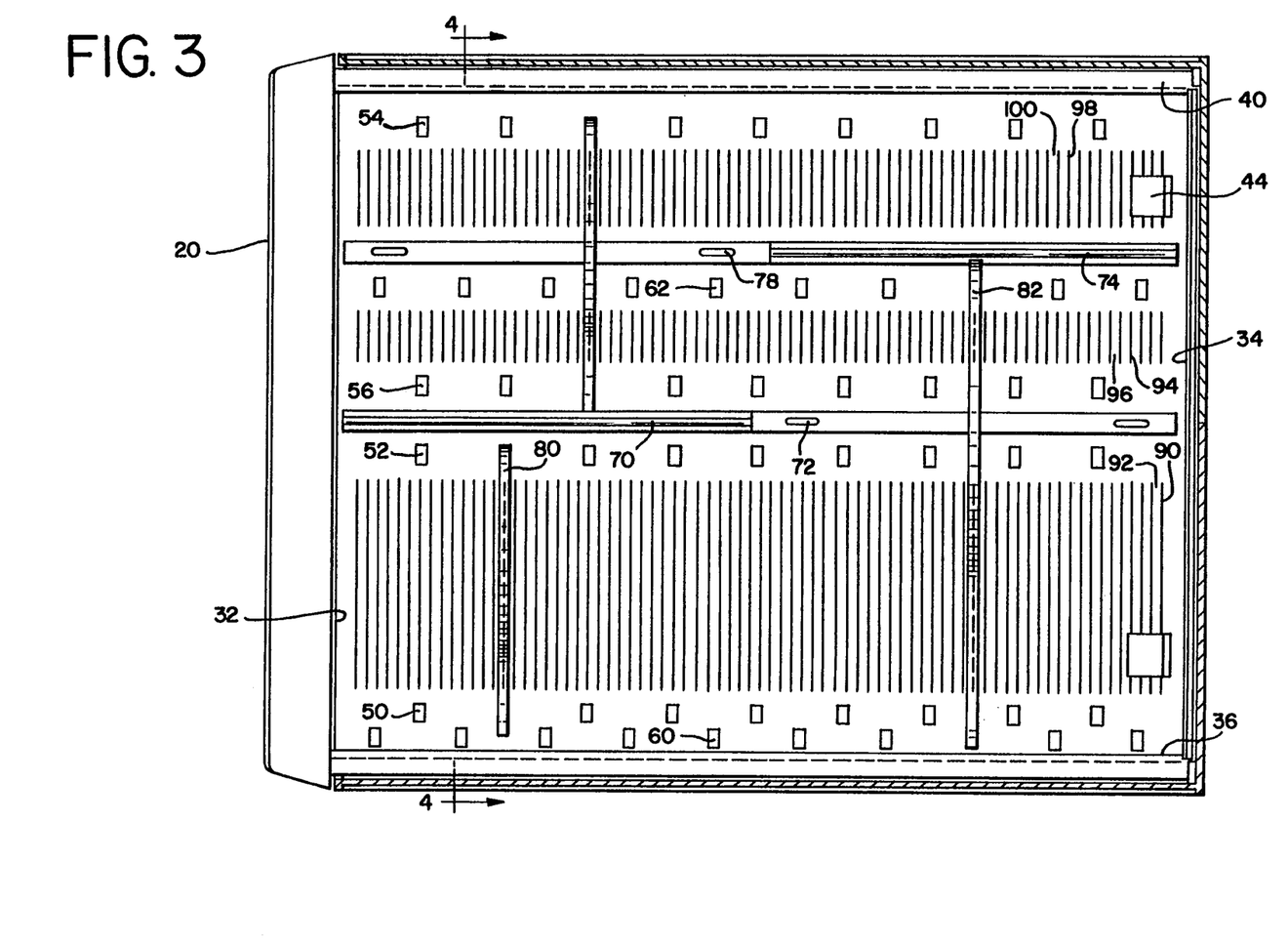
FIG. 3 is a top view of one embodiment of the drawer of the present invention with two small dividers, a center partition, a large divider, and an intermediate partition located within the drawer.

The drawer 30 also comprises a bottom 31 with dimensions determined by the lengths of the walls and having a plurality of columns of spaced apart slots. In one embodiment, as best seen in FIG. 3, the slots include a first column of spaced apart slots 50 adjacent to the first side wall 36 and a first column of complementary spaced apart slots 52 adjacent to and on a first side of the approximate center longitudinal line of the bottom. A portion of the slots in the first column of complementary slots 52 lie in the same plane as the slots 50 in the first column.

A second column of spaced apart slots 54 is provided adjacent to the second side wall 40 with a second column of complementary spaced apart slots 56 provided adjacent to and on a second side of the approximate center longitudinal line of the bottom. A portion of the slots in the second column of complementary slots 56 lie in the same plane as the slots 54 in the second column.

A column of spaced apart intermediate slots 60 adjacent to the first side wall 36 is provided with the intermediate slots 60 being in an alternating relationship with the first column of slots 50. A column of complementary spaced apart intermediate slots 62 is provided and located between the second column of slots 54 and the second column of complementary slots 56 with a portion of the complementary intermediate slots 62 lying in the same plane as the slots 60 in the column of spaced apart intermediate slots. In accordance with the most preferred embodiment, the first column of slots 50 is located closer to the approximate center longitudinal line of the bottom than the column of spaced apart intermediate slots 60.

The first column of spaced apart slots 50 and the first column of complementary spaced apart slots 52 are adapted to removably engage a small divider 80 to further partition and organize material placed within the drawer 31. The second column of spaced apart slots 54 and the second column of complementary spaced apart slots 56 are also adapted to removably engage the small divider 80. The column of spaced apart intermediate slots 60 and the column of complementary spaced apart intermediate slots 62 are adapted to removably engage a large divider 82 to further organize the drawer 30. Of course, any number of small dividers 80 may be provided for corresponding slots 50 and 52, and 54 and 56 and any number of large dividers 82 may be provided for corresponding slots 60 and 62.

As noted, the small divider 80 can be provided to removably engage corresponding slots 50 and 52 as well as corresponding slots 54 and 56 to further partition the drawer 30. Preferably, the small divider 80 has depending tabs or legs which removably engage the slots 50 and 52, and 55 and 56. Likewise, the large divider 82 is preferably provided with depending tabs or legs to removably engage corresponding slots 60 and 62 to further segregate the drawer 30.

Figure 4:
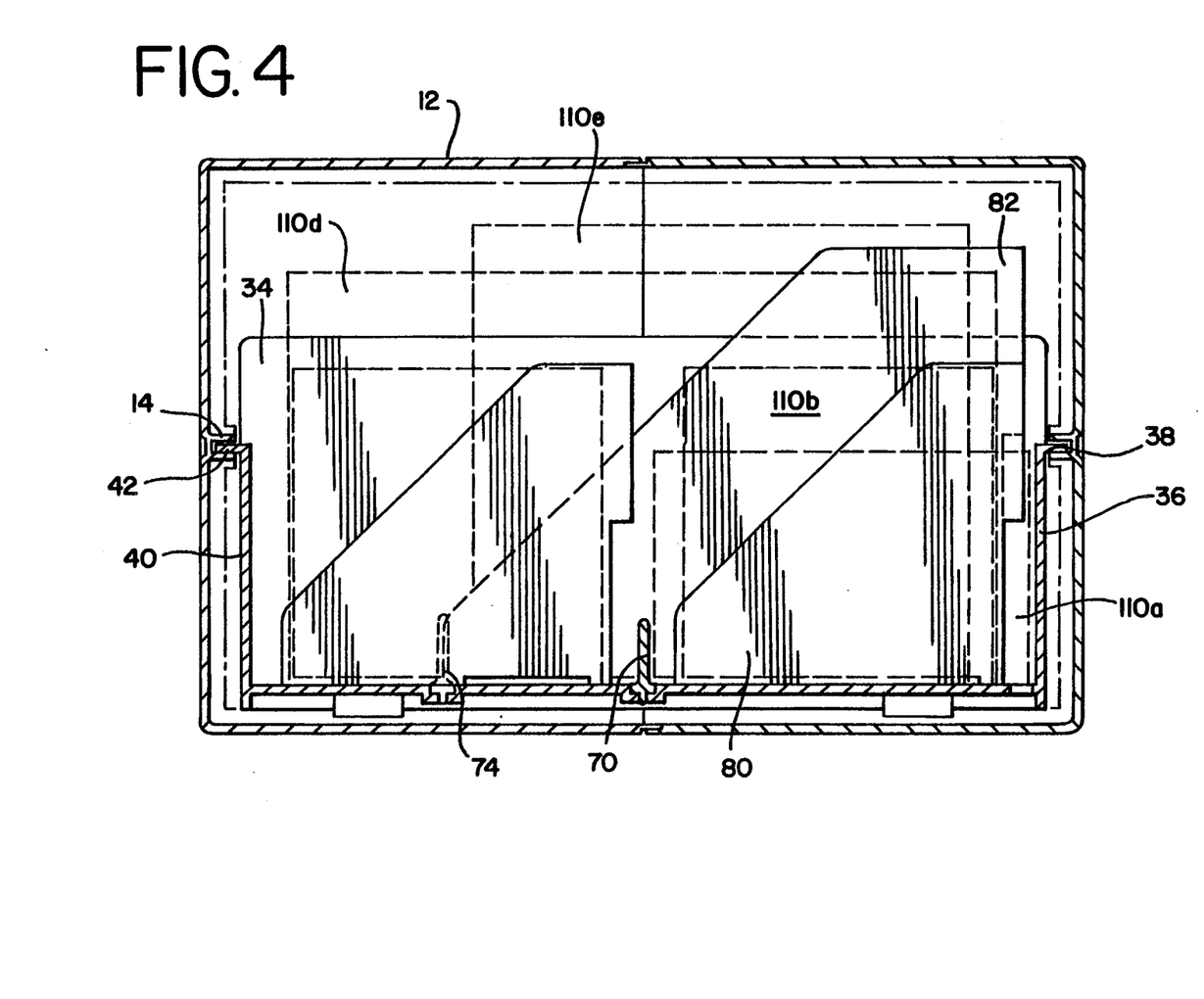
FIG. 4 is a cross-sectional view of the drawer of FIG. 3 taken along line 4—4 showing two small dividers, one large divider, various media located within the drawer.

When small dividers 80 are provided, it is preferred that at least one removable center removable partition 70 be provided along the approximate center longitudinal line of the bottom 31. The center partition 70 will then serve to divide the drawer 30 longitudinally in approximately equal portions. In addition, the center partition 70 can act as a side restraining or supporting wall when media such as a cassette tape or a 3½ inch computer diskette is placed within the drawer bottom, as best seen in FIG. 4. When the partition member 70 is provided in the bottom 31, it extends substantially vertically upward. The partition member 70 may have any desirable height, preferably less than the height of the first and second side walls 36 and 38.

The number of cassette tapes, 3½ inch diskettes, and the like that can be stored will be determined by the length of the drawer 30 and thus the bottom 31. The center partition member 70 may therefore have any suitable length up to the length of the bottom 31. Alternatively, a number of center partitions 70 may be provided, each lying in the same plane to provide a substantially continuous partition along the approximate center longitudinal line of the bottom 31.

Since the drawer 30 may be used to store media other than cassette tapes and 3½ inch computer diskettes, the removable center partition 70 preferably has a length less than the entire length of the bottom 31. When the length of the center partition 70 is less than the entire length of the bottom 31, more than one center partition 70 can be used. In this case, each insert 70 has the identical shape except for, in some cases, the length. Conveniently, the length of the insert 70 is about one-half the length of the bottom 31. In this case, the partitions 70 would be identical.

If a single partition 70 that has a length less than the entire length of the bottom 31 will be used, it can be placed, for example, in the front half of the drawer bottom 31 (FIGS. 2 and 3). When a partition 70 is placed in the front half, 3½ inch computer disks can be stored and organized in the front half of the drawer 30 while larger media such as 5¼ inch computer disks can be stored in the rear half of the drawer 30.

Most preferably, the center partition member 70 is provided with at least one depending tab or leg adapted to removably engage a corresponding center partition slot 72 which is located on the approximate center longitudinal line of the drawer bottom 31. In this way, the center partition 70 is secured from longitudinal and lateral movement, yet is easily removed by the user. Of course, to provide greater stability it may be desirable to provide more than one center partition slot to receive the center partitions 70. In accordance with the most preferred embodiment, two spaced apart center partition slots 72 are provided to removably engage a single center partition 70.

The drawer 30 may also be provided with at least one removable intermediate partition member 74 located between the second column of slots 54 and the column of complementary spaced apart intermediate slots 62. The intermediate partition member 74 is typically used when a large divider 82 is placed in the drawer 30. In this way, the intermediate partition 74 can act as a restraining or supporting wall when media such as 5¼ inch computer diskettes are placed within the drawer bottom. Of course, the intermediate partition 74 will serve to longitudinally divide the drawer. When the partition member 74 is provided in the bottom 31, it extends substantially vertically upward. The intermediate partition 74 may have any desirable height, preferably less than the height of the first and second walls 36 and 38.

The number of such 5¼ inch computer disks that can be stored will be determined by the length of the drawer 30. The intermediate partition 74 may therefore have any suitable length up to the length of the drawer 30. Alternatively, a number of intermediate partitions 74 may be provided, each lying in the same plane to provide a substantially continuous intermediate partition.

Preferably, the intermediate partition 74 has a length less than the length of the entire drawer 30. In this case, more than one intermediate partition 74 can be provided. Most preferably, the length of the intermediate partition 74 is about one-half the length of the drawer 30. In this case, each intermediate partition 74 is identical and, conveniently, each intermediate partition 74 is identical to the center partition 70.

Most preferably, the intermediate partition 74 is provided with at least one depending tab or leg adapted to removably engage a corresponding intermediate slot 78 which is located between the second column of slots 54 and the column of complementary spaced apart intermediate slots 62. In this way, the intermediate partition 74 is secured from longitudinal and lateral movement, yet is easily removed by the user. Of course, it may be desirable to provide more than one intermediate partition slot 78 to receive the intermediate partitions 74. In accordance with the most preferred embodiment, two spaced apart intermediate partition slots 78 are provided to removably engage a single intermediate partition 74.

Uniquely, the bottom 31 may be provided with only center partition members 70, only intermediate partition members 74, or a combination of center partitions 70 and intermediate partitions 74. Where only center partitions 70 are provided, media such as cassette tapes and 3¼ inch computer diskettes can be stored within the drawer 30. Where only intermediate partitions 74 are provided, media such as CD's and 5¼ inch computer diskettes can be stored. Where both a center partition 70 and an intermediate partition 74 are provided, a variety of media can be stored. For example, a center partition 70 can be provided in the front half of the drawer 30 and an intermediate partition 74 can be provided in the rear half of the drawer 30.

By providing this plurality of slots, partition members 70 and 74, small dividers 80, and large dividers 82, a plurality of varying media material can be easily stored, viewed, and organized within the drawer 30.

In accordance with the most preferred embodiment, stops 44 may be provided on the bottom 31 near the rear wall 34 so that as the drawer 30 is extracted from the case 12, the drawer will be stopped prior to being fully extracted. Each side wall 36 and 40 may also be provided with an outwardly extending lip 38 and 42, respectively, to slidably engage a ledge 14 provided on the inside of each side wall of the case 12. The side walls 36 and 40 may also extend downwardly below the bottom to slidably support the drawer within the case.

Figure 5:
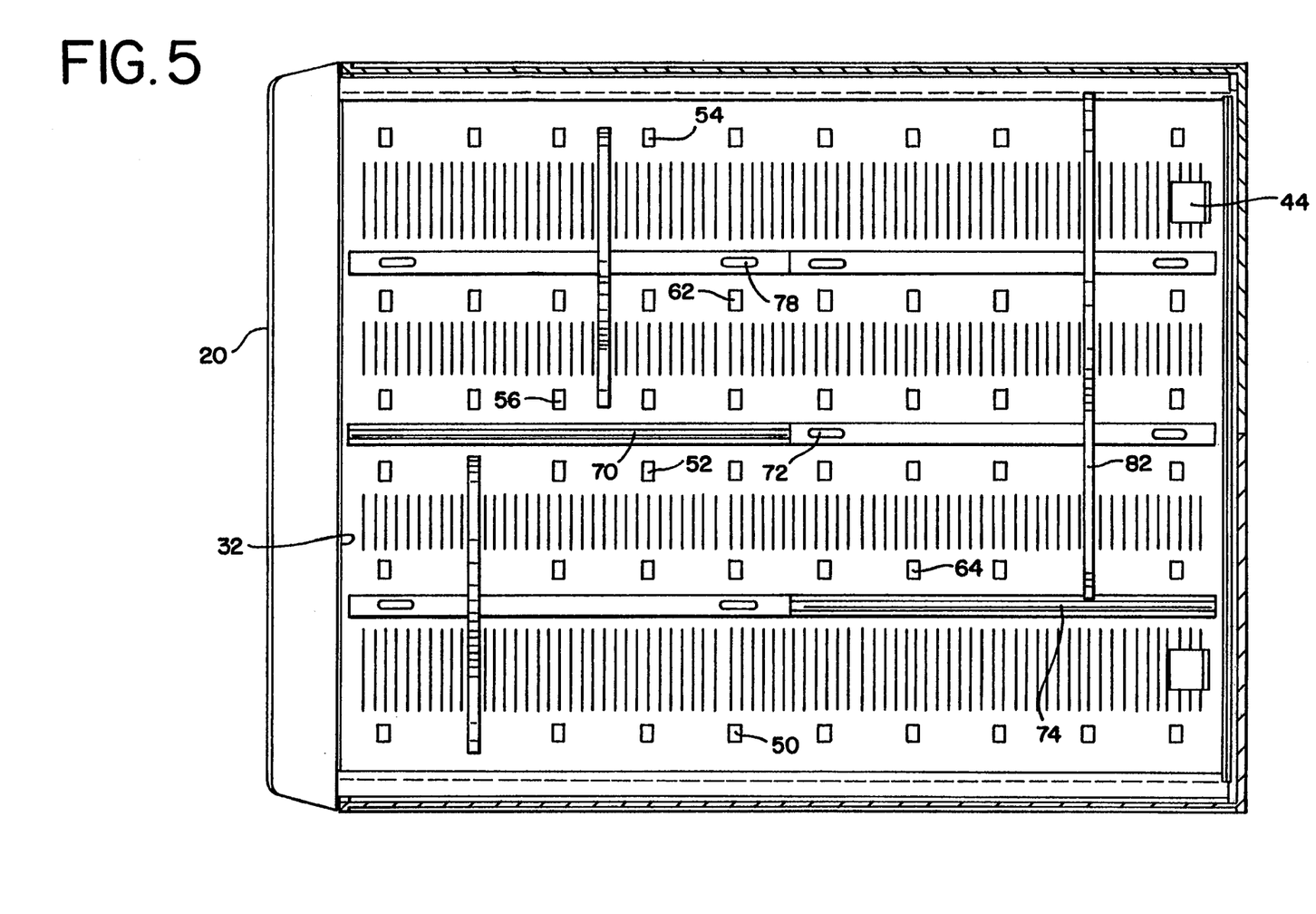
FIG. 5 is a top view of another embodiment of the drawer of the present invention with a large divider, an immediate partition, two small dividers, and a center partition located within the drawer.

FIG. 5 shows an alternative embodiment, wherein like numerals also refer to like parts, the drawer bottom 31 comprises a first column of spaced apart slots 50 adjacent to the first side wall 36 and a first column of complementary spaced apart slots 52 adjacent to and on a first side of the approximate center longitudinal line of the bottom, with a portion of the slots in the first column of complementary slots 52 lying in the same plane as the slots 50 in the first column. The bottom 31 is also provided with a second column of spaced apart slots 54 adjacent to the second side wall 38 and a second column of complementary spaced apart slots 56 adjacent to and on a second side of the approximate center longitudinal line of the bottom, with a portion of the slots in second column of complementary slots 56 lying in the same plane as the slots 54 in the second column. A column of complementary spaced apart intermediate slots 62 are provided and located between the second column of slots 54 and the second complementary slots 56, with a portion of the slots in the column of complementary intermediate slots 62 lying in the same plane as the slots 50 in the first column.

By providing this arrangement of slots, the small dividers 80 are adapted to be removably engaged with corresponding slots 50 in the first column of spaced apart slots and the first column of complementary spaced apart slots 52 as well as with the second column of spaced apart slots 54 and the second column of complementary spaced apart slots 56. Advantageously, the large divider 82 is adapted to be removably engaged with corresponding slots in the first column of spaced apart slots 50 and the column of complementary spaced apart intermediate slots 62.

In this embodiment, the bottom 31 may further have a second column of complementary spaced apart intermediate slots 64 provided between the first column of slots 50 and the first column of complementary slots 52 with a portion of the second complementary intermediate slots 64 lying in the same plane as the slots 54 in the second column. The large divider 82 is adapted to be removably engaged by corresponding slots located in the second column of slots 54 and the second column of complementary spaced apart intermediate slots 64 as well as by corresponding slots located in the first column of slots 50 and the first column of complementary spaced apart intermediate slots 62 to removably secure the divider.

Of course, in this embodiment, the center partition 70 and intermediate partition 74, as described above, can be provided and are preferably identical.

In accordance with the most preferred embodiment, a plurality of columns of spaced apart ridges are provided on the bottom 31, the columns being parallel to the first side wall 36. Adjacent ridges define an area where media can be positioned and substantially secured from movement. Preferably, three columns of ridges are provided. A first column comprises ridges 90 located between the first column of slots 50 and the first column of complementary slots 52. Adjacent ridges 90 define an area 92 where media (e.g. computer diskettes) can be positioned and substantially secured from movement. A second column of spaced apart ridges comprises ridges 94 located between the second column of complementary spaced apart slots and the column of complementary spaced apart intermediate slots 62. Adjacent ridges 94 define an area 96 where media can be positioned and substantially secured from movement. A third column of ridges comprise spaced apart ridges 98 located between the second column of spaced apart slots 54 and the column of complementary spaced apart intermediate slots. Adjacent ridges 98 define an area 100 where media can be positioned and substantially secured from movement. The location and number of the columns of ridges may vary depending on the number and location of the columns of slots.

It will be understood to one skilled in the art that the plurality of slots provided in the drawer bottom have been described as comprising complementary pairs of slots to removably receive dividers having a pair of depending tabs or legs. In accordance with the present invention, it is to be understood that the dividers may be provided with only a single depending tab or leg. In this case, the tab or leg may engage any one of the slots provided on the drawer bottom even when they are provided as complementary pairs. It is contemplated, however, that only one of the columns of slots of each of the complementary pairs of columns need be provided. For example, only the first column of slots 50 need be provided. In this case, a divider, either a small divider or a large divider can be provided and can have a single depending tab or leg to removably engage a slot 50.

Where only one of the columns of complementary slots are to be provided, it is desired to provide the first column of slots 50 and the second column of slots 54. In this case, the center and intermediate partitions can be provided as described above and shown in either of FIG. 3 or 5 and either a large or a small divider having a depending tab can be provided to removably engage a slot in the first column of slots 50 or in the second column of slots 54.

Of course it should be understood that a wide range of changes and modifications can be made to the embodiments described above. It is therefore intended that the foregoing description illustrates rather than limits this invention, and that it is the following claims, including all equivalents, which define this invention.

I claim:

1. An extractable drawer for a modular multi-media cabinet comprising:
    a bottom and four walls extending upwardly from the bottom to define an inside of the drawer, the walls including a front wall, a rear wall spaced from and substantially parallel to the front wall, a first side wall at a substantially right angle to the front wall, and a second side wall spaced from and substantially parallel to the first side wall;
    the bottom having an approximate center longitudinal line located approximately at the midpoint between the first and second side walls, the bottom further having
        i. a first column of spaced apart slots adjacent to the first side wall,
        ii. a first column of complementary spaced apart slots adjacent to and on a first side of the approximate center longitudinal line of the bottom, with at least some of the slots in the first column of complementary spaced apart slots lying in the same transverse plane as the slots in the first column of spaced apart slots,
        iii. a second column of spaced apart slots adjacent to the second side wall,
        iv. a second column of complementary spaced apart slots adjacent to and on a second side of the approximate center longitudinal line of the bottom, with at least some of the slots in the second column of complementary spaced apart slots lying in the same transverse plane as the slots in the second column of spaced apart slots, and
        v. a column of complementary spaced apart intermediate slots located between the second column of spaced apart slots and the second column of spaced apart complementary slots, with at least some of the slots in the column of complementary intermediate spaced apart slots lying in the same transverse plane as the slots in the first column of spaced apart slots.

2. The drawer of claim 1 wherein at least some of the slots in the second column of spaced apart slots lie in the same transverse plane as the slots in the first column of spaced apart slots.

3. The drawer of claim 1 further having at least one removable center partition located at the approximate center longitudinal line of the bottom.

4. The drawer of claim 3 further having at least one center longitudinal slot provided in the drawer bottom at the approximate center longitudinal line of the bottom and adapted to receive the removable center partition.

5. The drawer of claim 1 further having at least one removable intermediate partition member located between the second column of spaced apart slots and the column of complementary spaced apart intermediate slots.

6. The drawer of claim 5 further having at least one removable longitudinal slot provided in the drawer bottom between the second column of spaced apart slots and the column of complementary spaced apart intermediate slots, the longitudinal slot adapted to receive the removable intermediate partition.

7. The drawer of claim 3 further having at least one removable intermediate partition member located between the second column of spaced apart slots and the column of complementary spaced apart intermediate slots.

8. The drawer of claim 7 wherein the removable intermediate partition member and the removable center partition member have substantially the same shape.

9. The drawer of claim 1 further having at least one small divider adapted to removably engage a slot in the first column of spaced apart slots and a corresponding slot in the first column of complementary spaced apart slots thereby removably securing the divider.

10. The drawer of claim 9 wherein the divider is adapted to removably engage a slot in the second column of spaced apart slots and a corresponding slot in the second column of complementary spaced apart slots thereby removably securing the divider.

11. The drawer of claim 1 further comprising at least one large divider adapted to removably engage a slot in the first column of spaced slots and a corresponding slot in the first column of complementary spaced apart intermediate slots thereby removably securing the divider.

12. The drawer of claim 1 further having a second column of complementary spaced apart intermediate slots located between the first column of spaced apart slots and the first column of complementary spaced apart intermediate slots, with at least some of the slots in the second column of complementary spaced apart intermediate slots lying in the same transverse plane as the slots in the second column of spaced apart slots.

13. The drawer of claim 12 further comprising at least one large divider adapted to removably engage a slot in the first column of spaced apart slots and a corresponding slot in the first column of complementary spaced apart intermediate slots thereby removably securing the divider.

14. The divider of claim 13 adapted to removably engage a slot in the second column of spaced apart slots and a corresponding slot in the second column of complementary spaced apart intermediate slots thereby removably securing the divider.

15. The drawer of claim 12 further having at least one removable second intermediate partition member located between the first column of spaced apart slots and the second column of complementary spaced apart intermediate slots.

16. The drawer of claim 15 further having at least one intermediate longitudinal slot provided in the drawer bottom between the first column of spaced apart slots and the second column of complementary spaced apart intermediate slots, the longitudinal slot adapted to receive the removable second intermediate partition.

17. An extractable drawer for a modular multi-media cabinet comprising:

a bottom and four walls extending upwardly from the bottom to define an inside of the drawer, the walls including a front wall, a rear wall spaced from and substantially parallel to the front wall, a first side wall at a substantially right angle to the front wall, and a second side wall spaced from and substantially parallel to the first side wall;

the bottom having an approximate center longitudinal line located approximately at the midpoint between the first and second side walls, the bottom further having i. a first column of spaced apart slots adjacent to the first side wall, ii. a first column of complementary spaced apart slots adjacent to and on a first side of the approximate center longitudinal line of the bottom, with at least some of the slots in the first column of complementary spaced apart slots of lying in the same transverse plane as the slots in the first column of spaced apart slots, iii. a second column of spaced apart slots adjacent to the second side wall, iv. a second column of complementary spaced apart slots adjacent to and on a second side of the approximate center longitudinal line of the bottom, with at least some of the slots in the second column of complementary spaced apart slots lying in the same transverse plane as the slots in the second column of spaced apart slots, v. a column of spaced apart intermediate slots adjacent to the first side wall, the slots in the column of spaced apart intermediate slots being in an alternating relationship with the slots of the first column of spaced apart slots, and vi. a column of complementary spaced apart intermediate slots located between the second column of spaced apart slots and the second column of complementary spaced apart slots, with at least some of the slots in the column of complementary spaced apart intermediate slots lying in the same transverse plane as the slots in the column of spaced apart intermediate slots.

18. The drawer of claim 17 wherein at least some of the slots in the second column of spaced apart slots lie in the same transverse plane as the slots in the first column of spaced apart slots.

19. The drawer of claim 17 wherein the first column of spaced apart slots is located closer to the center longitudinal line of the bottom than the column of spaced apart intermediate slots.

20. The drawer of claim 17 further having at least one removable center partition located at the approximate center longitudinal line of the bottom.

21. The drawer of claim 20 further having at least one center longitudinal slot provided in the drawer bottom at the approximate center longitudinal line of the bottom and adapted to receive the removable center partition.

22. The drawer of claim 17 further having at least one removable intermediate partition member located between the second column of spaced apart slots and the column of complementary spaced apart intermediate slots.

23. The drawer of claim 22 further having at least one intermediate longitudinal slot provided in the drawer bottom between the second column of spaced apart slots and the column of complementary spaced apart intermediate slots, the longitudinal slot adapted to receive the removable intermediate partition.

24. The drawer of claim 23 wherein the intermediate longitudinal slots are adjacent to the column of complementary spaced apart intermediate slots.

25. The drawer of claim 17 further having at least one small divider adapted to removably engage a slot in the first column of spaced apart slots and a corresponding slot in the first column of complementary spaced apart slots thereby removably securing the divider.

26. The drawer of claim 25 wherein the divider is adapted to removably engage a slot in the second column of spaced apart slots and a corresponding slot in the second column of complementary spaced apart slots thereby removably securing the divider.

27. The drawer of claim 17 further comprising at least one large divider adapted to removably engage a slot in the column of spaced apart intermediate slots and a corresponding slot in the column of complementary spaced apart intermediate slots thereby removably securing the divider.

28. The drawer of claim 17 further comprising:
a first column of spaced apart lateral ridges extending upward from the bottom to define a column of first grooves, the ridges being located between the first column of spaced apart slots and the first column of complementary spaced apart slots.

29. The drawer of claim 28 further comprising a second column of spaced apart lateral ridges extending upward from the bottom to define a column of second grooves, the ridges being located between the second column of complementary spaced apart slots and the column of complementary spaced apart intermediate slots, with at least a portion of the grooves corresponding to the grooves in the first column.

30. The drawer of claim 29 further comprising a third column of spaced apart lateral ridges extending upward from the bottom to define a column of third grooves, the ridges being located between the second column of spaced apart slots and the column of complementary spaced apart intermediate slots, with at least a portion of the grooves corresponding to the grooves in the second column.

31. A modular multi-media cabinet comprising:
a. a cabinet case adapted to be attached to other cabinets; and
b. a drawer extractable from and slidably received by the cabinet case, the drawer having a bottom with four walls extending upward from the bottom to define an inside of the drawer, the walls including a front wall, a rear wall spaced from and substantially parallel to the front wall, a first side wall at a substantially right angle to the front wall, and a second side wall spaced from and substantially parallel to the first side wall, the bottom having an approximate center longitudinal line located approximately at the midpoint between the first and second side walls, the bottom further having i. a first column of spaced apart slots adjacent to the first side wall, ii. a first column of complementary spaced apart slots adjacent to and on a first side of the approximate center longitudinal line of the bottom, with at least some of the slots in the first column of complementary spaced apart slots lying in the same transverse plane as the slots in the first column of spaced apart slots, iii. a second column of spaced apart slots adjacent to the second side wall,
iv. a second column of complementary spaced apart slots adjacent to and on a second side of the approximate center longitudinal fine of the bottom, with at least some of the slots in the second column of complementary slots lying in the same transverse plane as the slots in the second column,
v. a column of spaced apart intermediate slots adjacent to the first side wall, the slots in the column of spaced apart intermediate slots being in an alternating relationship with the slots of the first column of spaced apart slots, and
vi. a column of complementary spaced apart intermediate slots located between the second column of spaced apart slots and the second column of complementary spaced apart slots, with at least some of the slots in the column of complementary spaced apart intermediate slots lying in the same transverse plane as the slots in the column of spaced apart intermediate slots.

32. The drawer of claim 31 further comprising:
a. at least one downwardly extending stop integrally formed on the bottom near the rear wall so that as the drawer is pulled out of the cabinet case the drawer will be stopped prior to being fully extracted.

33. The modular multi-media cabinet of claim 31 in which the cabinet case further has at least one connecting hole at each of its lateral edges adapted to receive removable connecting clips.

34. The modular multi-media cabinet of claim 31 further having a label frame with a label lens located on the outer front wall of the drawer.

35. The modular multi-media cabinet of claim 31 wherein each side wall of the drawer has an outwardly extending lip at its upper edge to slidably engage a ledge provided on the inside of each side wall of the case.

36. An extractable drawer for a modular multi-media cabinet comprising:
a. a bottom with four walls extending upward from the bottom, the walls including a front wall, a rear wall spaced from and substantially parallel to the front wall, a first side wall at a substantially right angle to the front wall, and a second side wall spaced from and substantially parallel to the first side wall to define an inside of the drawer, the bottom having an approximate center longitudinal line defined as approximately at the midpoint between the first and second side walls, the bottom further having
i. a first column of spaced apart slots adjacent to the first side wall, and
ii. a second column of spaced apart slots adjacent to the second side wall; and
b. at least one small divider adapted to removably engage a slot in the first column of spaced apart slots or a slot in the second column of spaced apart slots, the small divider when engaged in the slot extends toward but not beyond the approximate center longitudinal line of the drawer.

37. The drawer of claim 36 further having at least one large divider adapted to removably engage a slot in the first column of spaced apart slots or a slot in the second column of spaced apart slots, the large divider when engaged in the slot extends beyond the center longitudinal line of the drawer.

38. An extractable drawer for a modular multi-media cabinet comprising:
a. four upwardly extending walls including a front wall, a rear wall spaced from and substantially parallel to the front wall, a first side wall at a substantially right angle to the front wall, and a second side wall spaced from and substantially parallel to the first side wall; and
b. a bottom having
i. a first column of spaced apart slots adjacent to the first side wall,
ii. a first column of complementary spaced apart slots adjacent to and on a first side of the approximate center longitudinal line of the bottom, with a portion of the complementary slots lying in the same plane as the slots in the first column,
iii. a second column of spaced apart slots adjacent to the second side wall,
iv. a second column of complementary spaced apart slots adjacent to and on a second side of the approximate center longitudinal line of the bottom, with a portion of the complementary slots lying in the same plane as the slots in the second column,
v. a column of spaced apart intermediate slots adjacent to the first side wall, the intermediate slots being in an alternating relationship with the first column of slots,
vi. a column of complementary spaced apart intermediate slots located between the second column of slots and the second complementary slots, with a portion of the complementary intermediate slots lying in the same plane as the column of spaced apart intermediate slots, and
vii. a first column of spaced apart lateral ridges extending upward from the bottom to define a column of first grooves, the ridges being located between the column of first slots and the column of first complementary slots.

39. The drawer of claim 38 further comprising a second column of spaced apart lateral ridges extending upward from the bottom to define a column of second grooves, the ridges being located between the column of second complementary slots and the column of intermediate complementary slots, with at least a portion of the grooves corresponding to the grooves in the first column.

40. The drawer of claim 39 further comprising a third column of spaced apart lateral ridges extending upward from the bottom to define a column of third grooves, the ridges being located between the second column of slots and the column of intermediate complementary slots, with at least a portion of the grooves corresponding to the grooves in the second column.

41. An extractable drawer for a modular multi-media cabinet comprising:
a. four upwardly extending walls including a front wall, a rear wall spaced from and substantially parallel to the front wall, a first side wall at a substantially right angle to the front wall, and a second side wall spaced from and substantially parallel to the first side wall;
b. a bottom with an approximate center longitudinal line, the bottom having
i. a first column of spaced apart slots adjacent to the first side wall, and
ii. a second column of spaced apart slots adjacent to the second side wall;

c. at least one small divider adapted to removably engage a slot in the first column or a slot in the second column, the small divider when engaged in the slot extends toward but not beyond the approximate center longitudinal line of the drawer; and d. at least one large divider adapted to removably engage a slot in the first column or a slot in the second column, the large divider when engaged in the slot extends beyond the center longitudinal line of the drawer.

* * * * *

UNITED STATES PATENT AND TRADEMARK OFFICE
CERTIFICATE OF CORRECTION

PATENT NO. : 5,358,321
DATED : October 25, 1994
INVENTOR(S) : Paolo Leonardi

It is certified that error appears in the above-indentified patent and that said Letters Patent is hereby corrected as shown below:

IN THE CLAIMS

Col. 10, line 7, claim 6, delete "removable" and substitute --intermediate--.

Col. 11, claim 17, line 5, delete "fight" and substitute --right--.

Col. 13, claim 31, line 5, delete "fine" and substitute --line--.

Signed and Sealed this

Sixteenth Day of May, 1995

Attest:

BRUCE LEHMAN

Attesting Officer

Commissioner of Patents and Trademarks